Oct. 4, 1955 P. PALLUEL ET AL 2,719,954
ULTRA-SHORT WAVE OSCILLATOR
Filed May 23, 1950
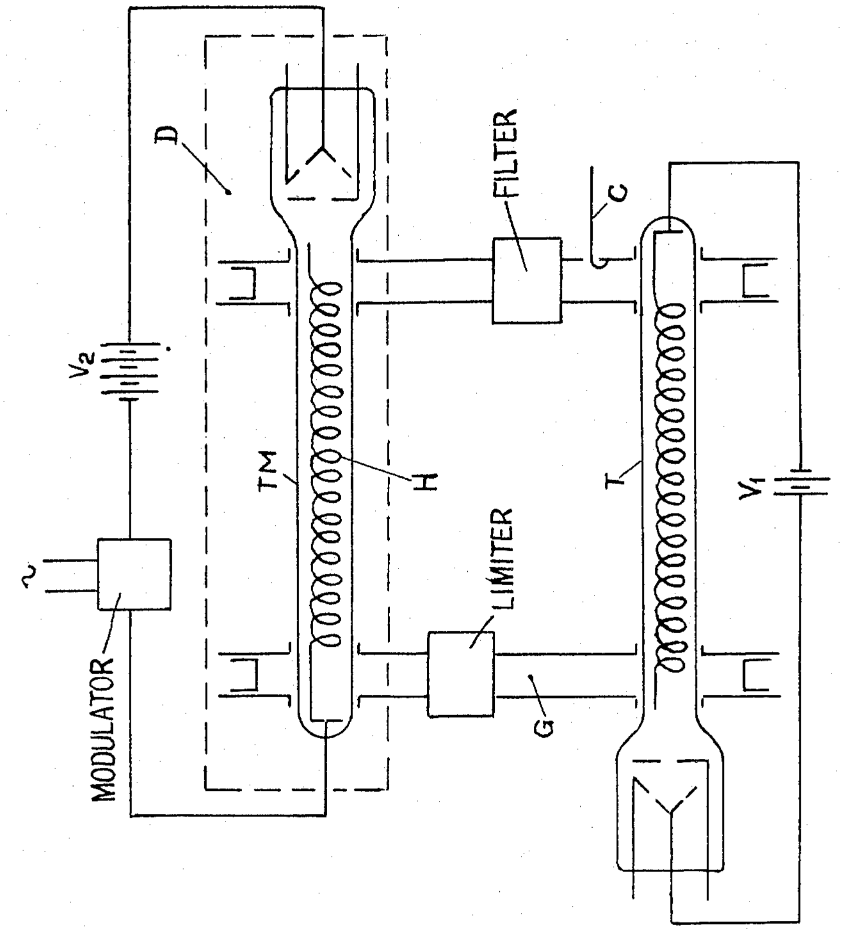
INVENTORS
PIERRE PALLUEL
MARCEL DENIS
By:
Haseltine, Lake & Co.
AGENTS United States Patent Office 2,719,954

Patented Oct. 4, 1955

2,719,954

ULTRA-SHORT WAVE OSCILLATOR

Pierre Palluel and Marcel Denis, Paris, France, assignors to Compagnie Generale de Telegraphie Sans Fil, a corporation of France Application May 23, 1950, Serial No. 163,623

Claims priority, application France May 24, 1949

1 Claim. (Cl. 332—7)

This invention relates to ultra-short wave oscillators for use in particular on decimetre and centimetre waves and more specifically to ultra-short wave oscillators comprising travelling wave tubes.

There is described in copending application Serial No. 104,282, filed on July 12, 1949, in the names of L. Brück, O. Doehler and W. Kleen, a travelling wave tube oscillator provided with a feedback channel between its output end and its input end, the said oscillator being characterised by the arrangement in the said channel of a filter designed to select a possible oscillation range on a single mode and of a phase shifter for adjusting the phase so as to render this oscillation possible.

The said phase shifter is so dimensioned as to introduce an additional phase displacement, complementing the natural phase displacement along the said feedback channel, until the total retrocoupled energy phase displacement between output and input ends of the channel reaches a value $2\pi N$, N being a whole number. The band-pass of said filter is so dimensioned as to select a band of predetermined frequencies in the tuning band of said oscillator.

It is also proposed in the said copending application and also in copending application Serial No. 138,092 filed on January 12, 1950, in the names of W. Kleen and O. Doehler, to regulate the frequency of oscillation of such an oscillator by varying the feed voltages of the elements of the tube, such as the delay line, or varying the direct current of the electron beam in the tube.

Experience has shown that it is difficult to modulate such an oscillator in frequency by acting on the elements of the tube itself, and more especially that it is difficult to obtain wide linear frequency variations in this way. In effect, action on the elements of the tube modifies the conditions of interaction between the electron beam and the high-frequency wave, that is to say varies the gain and the useful power supplied by the tube. This results in a variation of the amplitude of the signal in the tuning band. Such variation is frequently troublesome in practice and is likely to limit the useful width of the tuning band which can actually be obtained.

The first object of the present invention is to eliminate these disadvantages and this object is achieved, according to the invention, by modulating the frequency of the tube by action on the phase-shifting element provided in the feedback channel.

A second object of the invention is to constitute the said phase-shifter by an auxiliary travelling wave tube, the feed voltages of which are so modified as to obtain the desired phase variations in the feedback channel.

This auxiliary tube, which is acted on by a weak signal and has only to supply the maintaining signal, may be a low-power tube and is preferably employed in the zone in which the characteristic curve of gain shows substantially no variations with the frequency.

The invention will be more readily understood with reference to the accompanying single figure, which shows an embodiment thereof by way of example.

In the figure, there is diagrammatically shown a travelling wave tube T provided with a feedback channel G in which are provided a filter F and a phase shifter D and from which the output energy is taken at C.

It is known from the copending application Serial No. 104,282, that in an oscillator comprising an electronic tube, excited by means of an external feedback channel, there are excited only those frequencies, by which the phase shift between the input voltage and the input feedback voltage is $\phi=2\pi N$, N being a whole number. This phase shifter is designed to introduce in the said feedback channel, which is ordinarily a wave guide, a phase shift, which, added to the inherent phase shift of the delay line of said tube, and the natural phase shift of the wave guide, has the required value of $2\pi N$.

Taking into account, that in an oscillator of this type, in which the electronic tube is a travelling wave tube, there are many modes of oscillations, of different frequencies, for which the said equation is verified, the purpose of said filter is to select a possible mode of oscillation, in a predetermined frequency band, the said band being the band-pass of the filter.

According to the invention, the phase shifter D is constituted by another travelling-wave tube TM, the delay line H of which receives a feed voltage from a source $V_2$ and upon which is superimposed a variable voltage emanating from a modulator M fed with the modulation voltage.

The length of the auxiliary tube and the velocity of propagation in the tube may readily be made such as to obtain the desired variation of the phase in a narrow electronic tuning zone, by means of which it is possible to obtain a linear relation between shift of the frequency and amplitude of the modulating signal.

The amplitude of the signal set up by the main tube can be kept constant by limiting the amplitude at the output end of the auxiliary tube by a limiting device L which has to absorb only very low power.

A phase variation equal to $2\pi$ and corresponding to the maximum frequency excursion is thus obtained by means of an auxiliary tube constructed and utilised under the most favourable conditions, this being achieved in practice independently of the performance of the main tube, the constructional factors and working conditions of which may be so selected that the performance is substantially independent of the operating frequency.

We claim:

In an oscillator for generating ultra high frequency energy, the combination of a travelling wave tube including a delay line having input and output ends, a feed-back channel directly coupled to the input and output ends of said delay line, a phase shifter and a filter arranged in series in said feed-back channel, said phase shifter being dimensioned to impart to energy fed back through said channel an additional phase displacement, over and above the natural displacement occasioned by said channel, bringing the total phase displacement to a value at which oscillations are sustained, and said filter being dimensioned to pass a band of frequencies of predetermined width in the spectrum of said oscillations, a source of voltage of low frequency as compared with said ultra high frequency, means for frequency modulating said phase shifter from said source, and means intermediate said filter and output end for connecting a load to said feed-back channel, wherein said phase shifter comprises a travelling wave tube including a delay line having input and output ends connected to said channel and a plurality of electrodes, and means connecting said source to at least one of said electrodes.

References Cited in the file of this patent

UNITED STATES PATENTS

| | | |
|---|---|---|
| 2,521,760 | Starr | Sept. 12, 1950 |
| 2,603,772 | Field | July 15, 1952 |
| 2,603,773 | Field | July 15, 1952 |